(12) United States Patent
Han et al.

(10) Patent No.: US 8,739,073 B2
(45) Date of Patent: May 27, 2014

(54) USER INTERFACE FOR DOCUMENT TABLE OF CONTENTS

(75) Inventors: Chris Han, Seattle, WA (US); Nathan Dunlap, North Bend, WA (US)

(73) Assignee: Microsoft Corporation, Redmond, WA (US)

(*) Notice: Subject to any disclaimer, the term of this patent is extended or adjusted under 35 U.S.C. 154(b) by 1037 days.

(21) Appl. No.: 11/803,467

(22) Filed: May 15, 2007

(65) Prior Publication Data

US 2008/0288894 A1 Nov. 20, 2008

(51) Int. Cl.
G06F 3/048 (2013.01)
G06F 3/0483 (2013.01)
G06F 3/0485 (2013.01)
G06F 17/21 (2006.01)

(52) U.S. Cl.
CPC .............. G06F 3/0483 (2013.01); G06F 3/048 (2013.01); *G06F 3/0485* (2013.01); *G06F 17/212* (2013.01); *Y10S 345/901* (2013.01)
USPC ........... 715/855; 715/712; 715/776; 715/810; 715/817; 715/838; 715/783; 345/418; 345/901

(58) Field of Classification Search
CPC ..... G06F 3/048; G06F 3/0483; G06F 3/0485; G06F 17/212; Y10S 345/901
USPC ......... 715/855, 838, 810, 817, 776, 712, 783; 345/418
See application file for complete search history.

(56) References Cited

U.S. PATENT DOCUMENTS

| | | | |
|---|---|---|---|
| 5,550,965 A * | 8/1996 | Gabbe et al. | 715/209 |
| 5,761,686 A * | 6/1998 | Bloomberg | 715/234 |
| 5,802,516 A | 9/1998 | Shwarts et al. | |
| 6,037,937 A * | 3/2000 | Beaton et al. | 715/764 |
| 6,105,044 A | 8/2000 | DeRose et al. | |
| 6,243,071 B1 * | 6/2001 | Shwarts et al. | 715/823 |
| 6,292,188 B1 * | 9/2001 | Carlson et al. | 715/854 |
| 6,457,026 B1 | 9/2002 | Graham et al. | |
| 6,466,237 B1 * | 10/2002 | Miyao et al. | 715/838 |
| 6,486,895 B1 * | 11/2002 | Robertson et al. | 715/776 |
| 6,507,858 B1 * | 1/2003 | Kanerva et al. | 715/234 |
| 6,587,121 B1 * | 7/2003 | Nelson et al. | 715/705 |
| 6,613,100 B2 * | 9/2003 | Miller | 715/273 |

(Continued)

OTHER PUBLICATIONS

Taz Tally, Customize the Adobe Acrobat 8 Interface, Mar. 16, 2007, Acrobat Tutorial, http://layersmagazine.com/customize-the-adobe-acrobat-8-interface.html.*

(Continued)

*Primary Examiner* — Patrick Riegler
(74) *Attorney, Agent, or Firm* — Tony Azure; Andrew Sanders; Micky Minhas

(57) ABSTRACT

Various technologies and techniques are disclosed for providing a table of contents for a document viewer application. A document viewer application is provided that can display a document that has multiple pages of content. Upon receiving a selection from the user to access a table of contents for the document, a table of contents is displayed that contains a representation of at least some of the pages of content in a manner that is overlaid on top of a current position in the document. A navigation feature allows a user to navigate through the table of contents while retaining the current position in the document. A preview size adjustment feature allows the user to adjust a size of the representation of the pages of content for the document.

20 Claims, 10 Drawing Sheets

(56) References Cited

U.S. PATENT DOCUMENTS

| | | | |
|---|---|---|---|
| 6,714,209 B2 | 3/2004 | Van Valer | |
| 6,915,489 B2* | 7/2005 | Gargi | 715/790 |
| 6,964,025 B2 | 11/2005 | Angiulo et al. | |
| 7,069,518 B2 | 6/2006 | Card et al. | |
| 7,269,290 B2* | 9/2007 | Tojo | 382/239 |
| 7,519,906 B2* | 4/2009 | Balabanovic et al. | 715/243 |
| 7,619,772 B2* | 11/2009 | Fukudome | 358/1.9 |
| 7,644,373 B2* | 1/2010 | Jing et al. | 715/838 |
| 7,650,578 B2* | 1/2010 | Shimokawa | 715/838 |
| 7,664,739 B2* | 2/2010 | Farago et al. | 707/722 |
| 7,770,123 B1* | 8/2010 | Meyer et al. | 715/760 |
| 7,844,918 B1* | 11/2010 | Ashe | 715/838 |
| 7,979,785 B1* | 7/2011 | Wang et al. | 715/200 |
| 2002/0083101 A1* | 6/2002 | Card et al. | 707/526 |
| 2002/0182578 A1* | 12/2002 | Rachman et al. | 434/350 |
| 2002/0191029 A1* | 12/2002 | Gillespie et al. | 345/810 |
| 2003/0042319 A1* | 3/2003 | Moore | 235/494 |
| 2004/0014013 A1 | 1/2004 | Diesel et al. | |
| 2004/0030719 A1 | 2/2004 | Wei | |
| 2004/0085364 A1* | 5/2004 | Keely et al. | 345/804 |
| 2004/0103038 A1* | 5/2004 | Power et al. | 705/26 |
| 2004/0205514 A1* | 10/2004 | Sommerer et al. | 715/501.1 |
| 2005/0034056 A1* | 2/2005 | Rubin et al. | 715/500 |
| 2005/0166149 A1* | 7/2005 | Frigon et al. | 715/712 |
| 2005/0210416 A1* | 9/2005 | MacLaurin et al. | 715/851 |
| 2006/0015925 A1* | 1/2006 | Logan | 725/135 |
| 2006/0058625 A1* | 3/2006 | Mori | 600/407 |
| 2006/0080716 A1* | 4/2006 | Nishikawa et al. | 725/89 |
| 2006/0085766 A1* | 4/2006 | Dominowska et al. | 715/854 |
| 2006/0123343 A1* | 6/2006 | Shimokawa | 715/712 |
| 2007/0174790 A1* | 7/2007 | Jing et al. | 715/838 |
| 2007/0180471 A1* | 8/2007 | Unz | 725/52 |
| 2007/0206923 A1* | 9/2007 | Murakoshi et al. | 386/95 |
| 2008/0059906 A1* | 3/2008 | Toki | 715/810 |
| 2008/0126982 A1* | 5/2008 | Sadikali et al. | 715/810 |
| 2008/0222552 A1* | 9/2008 | Batarseh et al. | 715/776 |

OTHER PUBLICATIONS

"Converting your document to PDF (Portable Document Format)", http://thesis.anu.edu.au/adt_pdf_instructions.html.

"ImageSite Pro", http://www.sharewareconnection.com/imagesite-pro.htm.

Grob Markus, "KPDF—App of the Month", http://kde.org.uk/apps/kpdf/.

Nation, et al., "Visualizing Websites Using a Hierarchical Table of Contents Browser: WebTOC", https://drum.umd.edu/dspace/bitstream/1903/898/2/CS-TR-3791.pdf.

* cited by examiner

USER INTERFACE FOR DOCUMENT TABLE OF CONTENTS

BACKGROUND

Various types of programs allow a user to view documents. For example, word processing documents can be viewed using supported word processors, such as MICROSOFT® Word or Corel Word Perfect. Other types of documents can be viewed in viewer applications such as Adobe Acrobat, or MICROSOFT® Reader. Such document viewers and/or editors typically have a table of contents feature that allow the user to access the contents of the document from within a different part of the document. One common approach is to list a table of contents at the beginning of the document. Another approach that is sometimes used is to list the table of contents in a separate panel, such as on the left hand side of the screen, to allow the user to view and navigate the document in parallel with reading the document. Yet another approach that is sometimes used is to display thumbnails of all of the content in the document in a separate panel, such as on the left hand side of the screen, to allow the user to view and navigate the document in parallel with reading the document.

SUMMARY

Various technologies and techniques are disclosed for providing a table of contents for a document viewer application. A document viewer application is provided that can display a document that has multiple pages of content. Upon receiving a selection from the user to access a table of contents for the document, a table of contents is displayed that contains a representation of at least some of the pages of content in a manner that is overlaid on top of a current position in the document. In one implementation, only some of the pages of content are displayed in the table of contents.

A navigation feature allows a user to navigate through the table of contents while retaining the current position in the document. In one implementation, an animation is provided to indicate how quickly the user is navigating through the table of contents. A preview size adjustment feature allows the user to adjust a size of the representation of the pages of content for the document.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
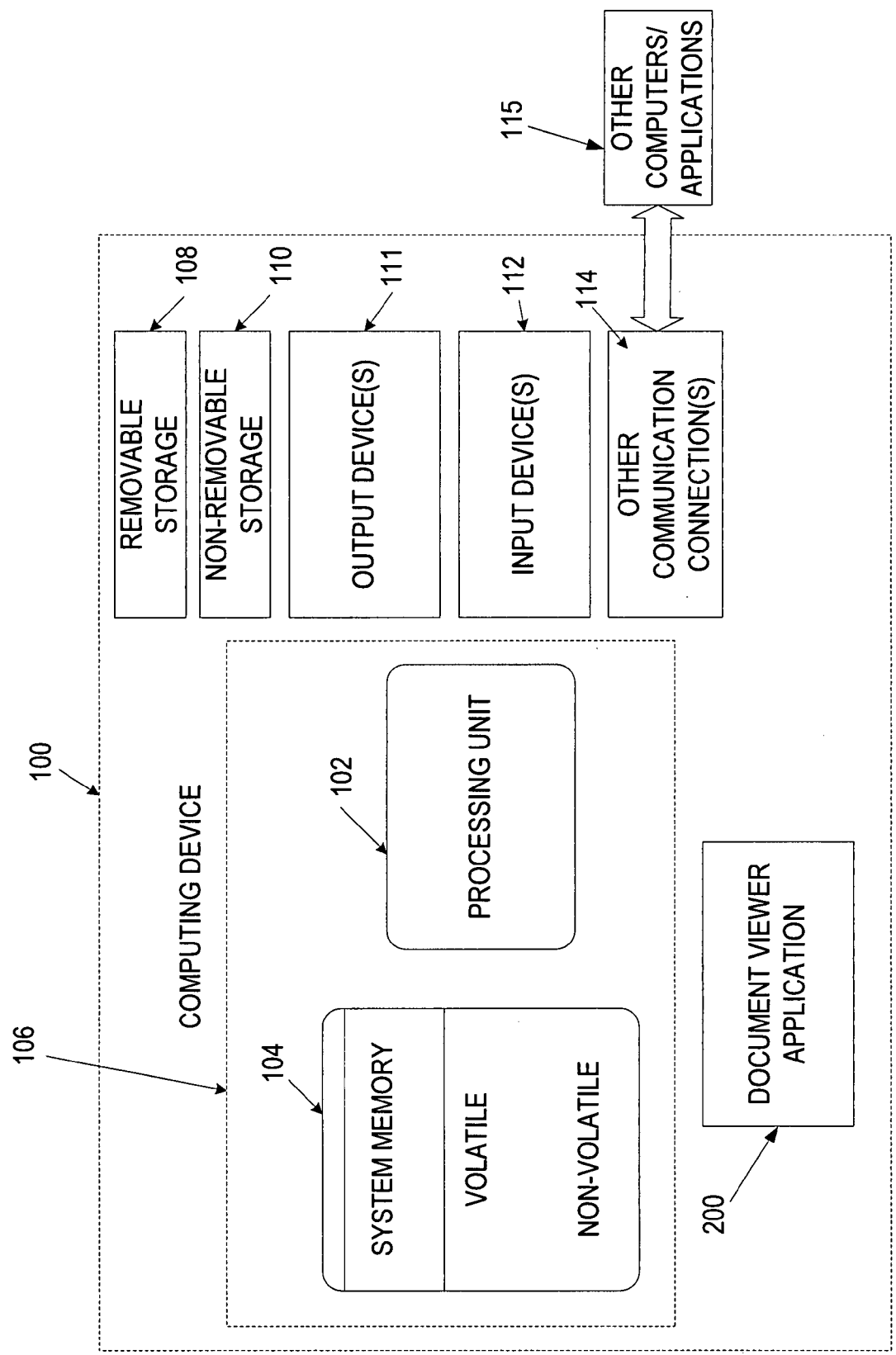
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a document viewing application, but the system also serves other purposes in addition to these. In one implementation, one or more of the techniques described herein can be implemented as features within a document viewing program such as MICROSOFT® Reader, from a word processing program such as MICROSOFT® Word or Corel Word Perfect, or from any other type of program or service that has features for allowing document contents to be viewed.

In one implementation, a document viewing application is provided with a table of contents that is overlaid on top of a current position of the content in the document. The user can navigate the table of contents without losing the current position in the document. Navigation and sizing features provide the user with additional control over how the table of contents is accessed and displayed. In one implementation, only a portion of the content of the document is displayed in the table of contents, such as the beginning of each chapter. In this fashion, the volume of information that a user must view in order to locate a desired section of the document is reduced.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes document viewer application 200. Document viewer application 200 will be described in further detail in FIG. 2.

Figure 2:
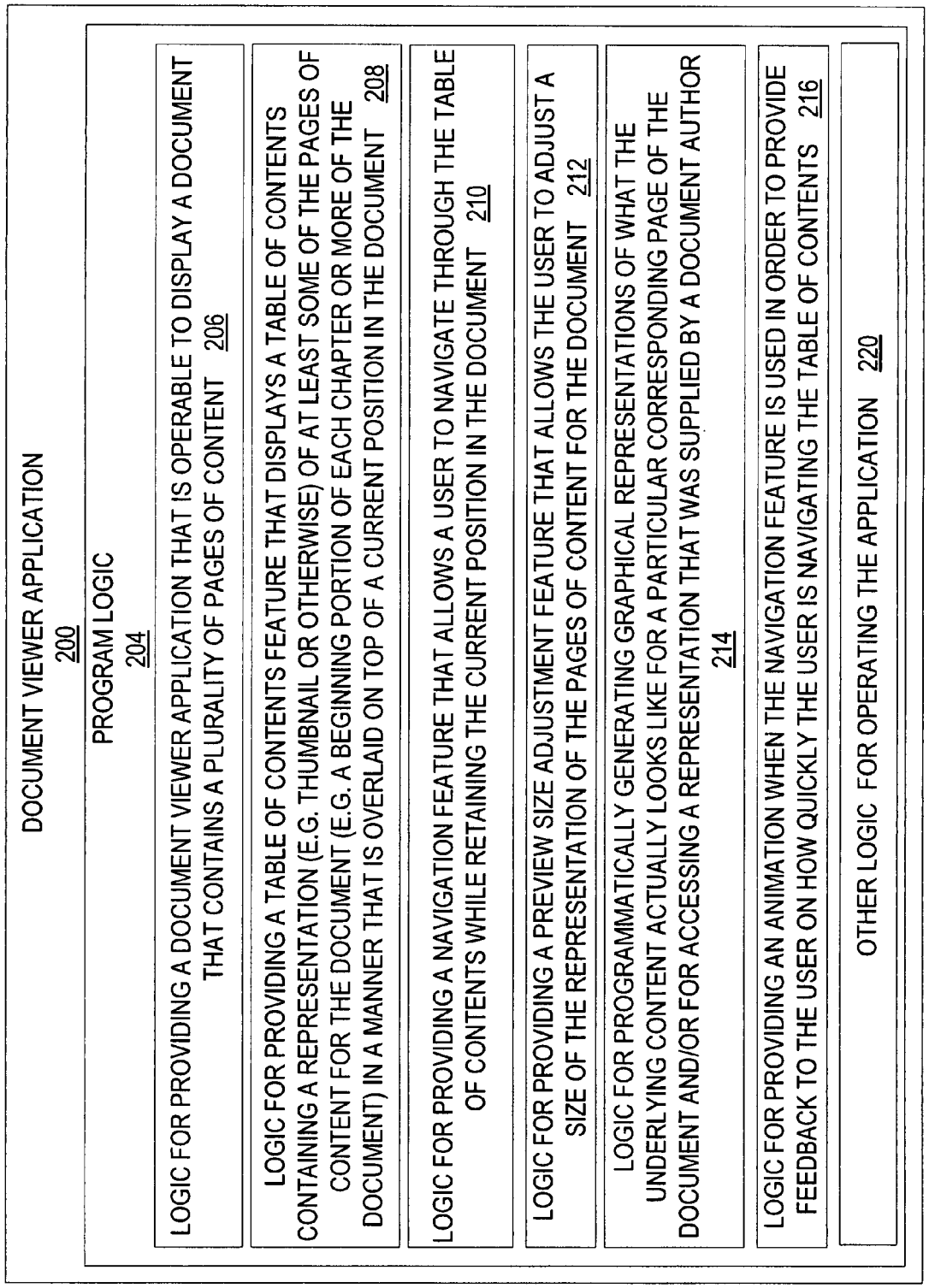
FIG. 2 is a diagrammatic view of a document viewer application of one implementation operating on the computer system of FIG. 1.

Turning now to FIG. 2 with continued reference to FIG. 1, a document viewer application 200 operating on computing device 100 is illustrated. Document viewer application 200 is one of the application programs that reside on computing device 100. However, it will be understood that document viewer application 200 can alternatively or additionally be embodied as computer-executable instructions on one or more computers and/or in different variations than shown on FIG. 1. Alternatively or additionally, one or more parts of document viewer application 200 can be part of system memory 104, on other computers and/or applications 115, or other such variations as would occur to one in the computer software art.

Document viewer application 200 includes program logic 204, which is responsible for carrying out some or all of the techniques described herein. Program logic 204 includes logic for providing a document viewer application that is operable to display a document that contains a plurality of pages of content 206; logic for providing a table of contents feature that displays a table of contents containing a representation (e.g. thumbnail or otherwise) of at least some of the pages of content for the document (e.g. a beginning portion of each chapter or more of the document) in a manner that is overlaid on top of a current position in the document 208; logic for providing a navigation feature that allows a user to navigate through the table of contents while retaining the current position in the document 210; logic for providing a preview size adjustment feature that allows the user to adjust a size of the representation of the pages of content for the document 212; logic for programmatically generating graphical representations of what the underlying content actually looks like for a particular corresponding page of the document and/or for accessing a representation that was supplied by a document author 214; logic for providing an animation when the navigation feature is used in order to provide feedback to the user on how quickly the user is navigating the table of contents 216; and other logic for operating the application 220. In one implementation, program logic 204 is operable to be called programmatically from another program, such as using a single call to a procedure in program logic 204.

Figure 3:
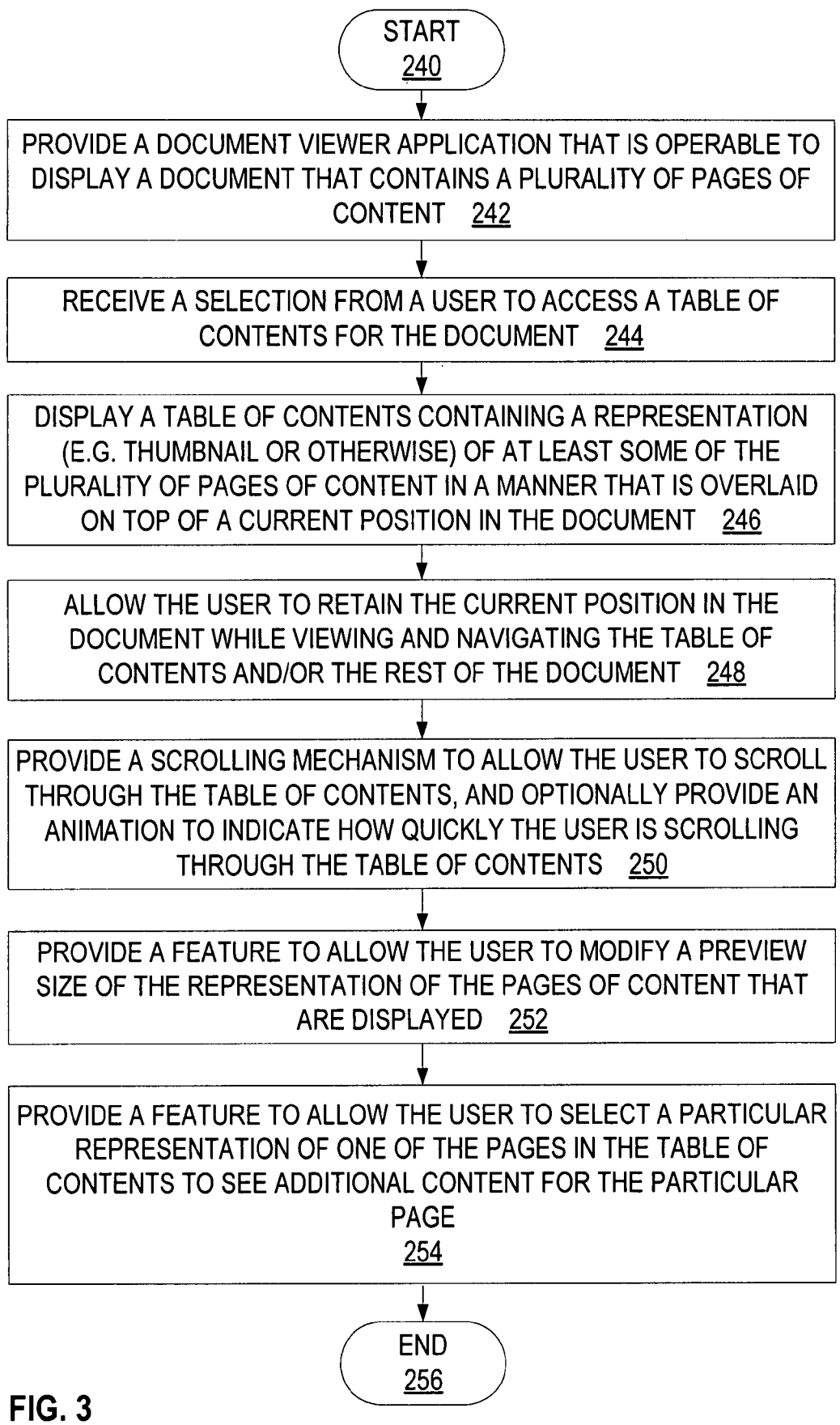
FIG. 3 is a high-level process flow diagram for one implementation of the system of FIG. 1.
Figure 4:
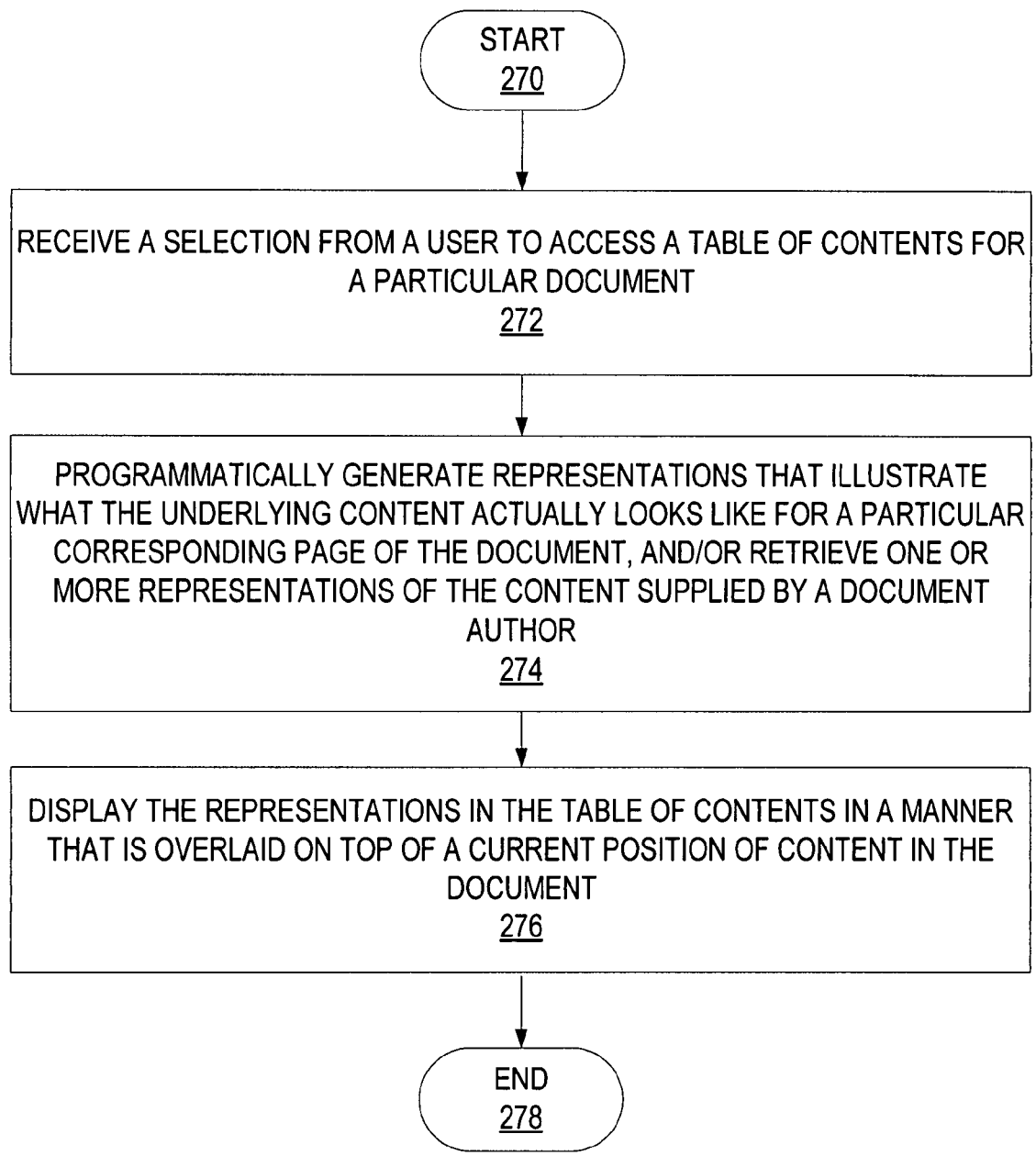
FIG. 4 is a process flow diagram for one implementation of the system of FIG. 1 illustrating the stages involved in generating the representations that are displayed in the table of contents.
Figure 5:
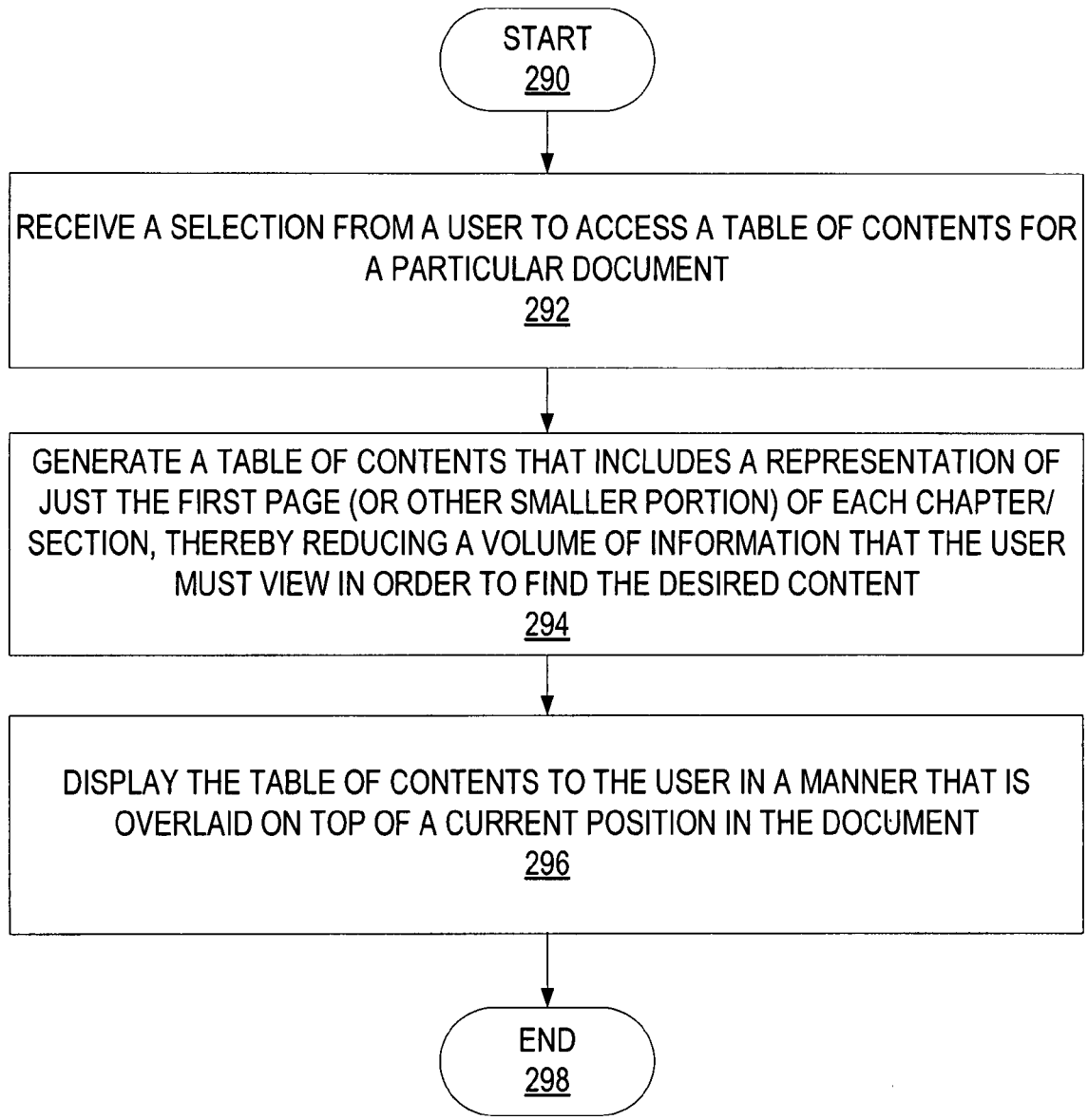
FIG. 5 is a process flow diagram for one implementation of the system of FIG. 1 illustrating the stages involved in generating the table of contents containing just a portion of each chapter/section of the document.

Turning now to FIGS. 3-5 with continued reference to FIGS. 1-2, the stages for implementing one or more implementations of document viewer application 200 are described in further detail. FIG. 3 is a high level process flow diagram for document viewer application 200. In one form, the process of FIG. 3 is at least partially implemented in the operating logic of computing device 100. The process begins at start point 240 with providing a document viewer application that is operable to display a document that contains a plurality of pages of content (stage 242). A selection is received from a user to access a table of contents for the document (stage 244). A table of contents is displayed that contains a representation (e.g. thumbnail or otherwise) of at least some of the plurality of pages of content in a manner that is overlaid on top of a current position in the document (stage 246). The user can page through each representation within the table of contents drop down or by using some other table of contents navigation means. By overlaying the table of contents over the document, the user can retain the current position in the document while viewing and navigating the table of contents and/or while viewing and navigating the rest of the document (stage 248).

Figure 8:
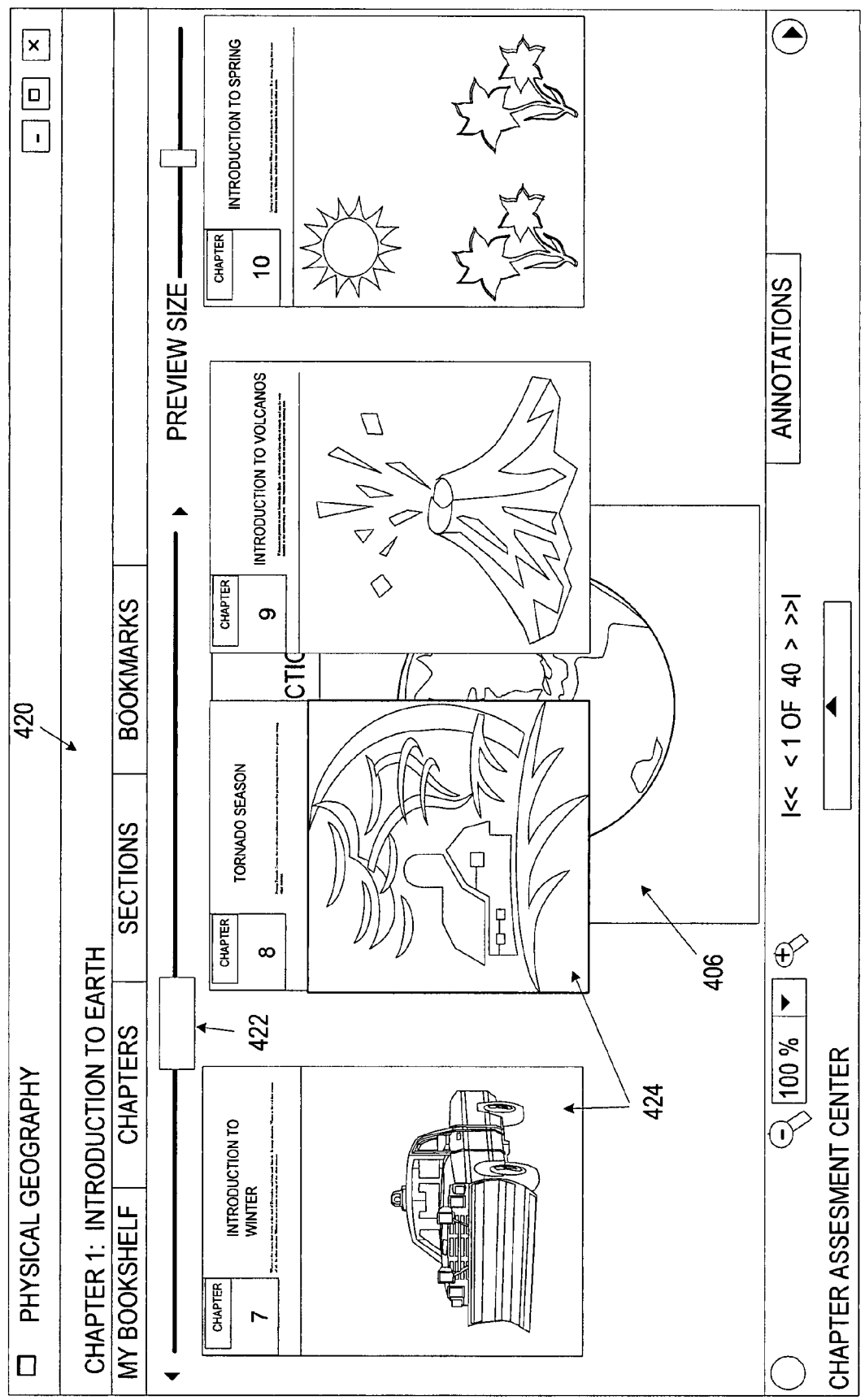
FIG. 8 shows a simulated screen of one implementation that illustrates the use of a scrolling/navigation feature that allows a user to navigate through the table of contents.

As further described in the discussion of FIG. 8, a scrolling/navigation mechanism is provided to allow the user to scroll through or otherwise navigate the table of contents (stage 250), such as with a scrollbar, selection of page up or page down key, tap of a stylus, flick of a finger, etc. The scrolling mechanism optionally includes an animation to visually indicate how quickly the user is scrolling through the table of contents (stage 250). As further described in the discussion of FIGS. 9 and 10, a preview size adjustment feature is provided to allow the user to modify the preview size of the representation of the pages of content that are displayed (stage 252). In one implementation, a feature is also provided to allow the user to select a particular representation of one of the pages in the table of contents to see additional content for the particular page (stage 254). For example, the user could select a particular representation in the table of contents to view that selection in a larger size and/or different area of the screen, or to make that selection the current page. The process ends at end point 256.

FIG. 4 illustrates one implementation of the stages involved in generating the representations that are displayed in the table of contents. In one form, the process of FIG. 4 is at least partially implemented in the operating logic of computing device 100. The process begins at start point 270 with receiving a selection from a user to access a table of contents for a particular document (stage 272). The system programmatically generates representations that illustrate what the underlying content actually looks like for a particular corresponding page of the document, and/or retrieves one or more representations of the content supplied by a document author (stage 274). The representations are then displayed in the table of contents in a manner that is overlaid on top of a current position of content in the document (stage 276). The process ends at end point 278.

FIG. 5 illustrates one implementation of the stages involved in generating the table of contents containing just a portion of each chapter/section of the document. In one form, the process of FIG. 5 is at least partially implemented in the operating logic of computing device 100. The process begins at start point 290 with receiving a selection from a user to access a table of contents for a particular document (stage 292). A table of contents is generated that includes a representation of just the first page (or other smaller portion) of each chapter/section, thereby reducing a volume of information that the user must view in order to find the desired content (stage 294). The representation can be a static image, live representation, or other type of representation. The table of contents is displayed to the user in a manner that is overlaid on top of a current position in the document (stage 296). In one implementation, the user can continue to browse and navigate the document while the table of contents is overlaid, such as to quickly skim the content to look for a specific piece of content. The process ends at end point 298.

Turning now to FIGS. 6-10, simulated screens are shown to illustrate a user interface for document viewer application 200 of one implementation. The same reference numbers will be used to refer to the same elements. These screens can be displayed to users on output device(s) 111. Furthermore, these screens can receive input from users from input device(s) 112.

Figure 6:
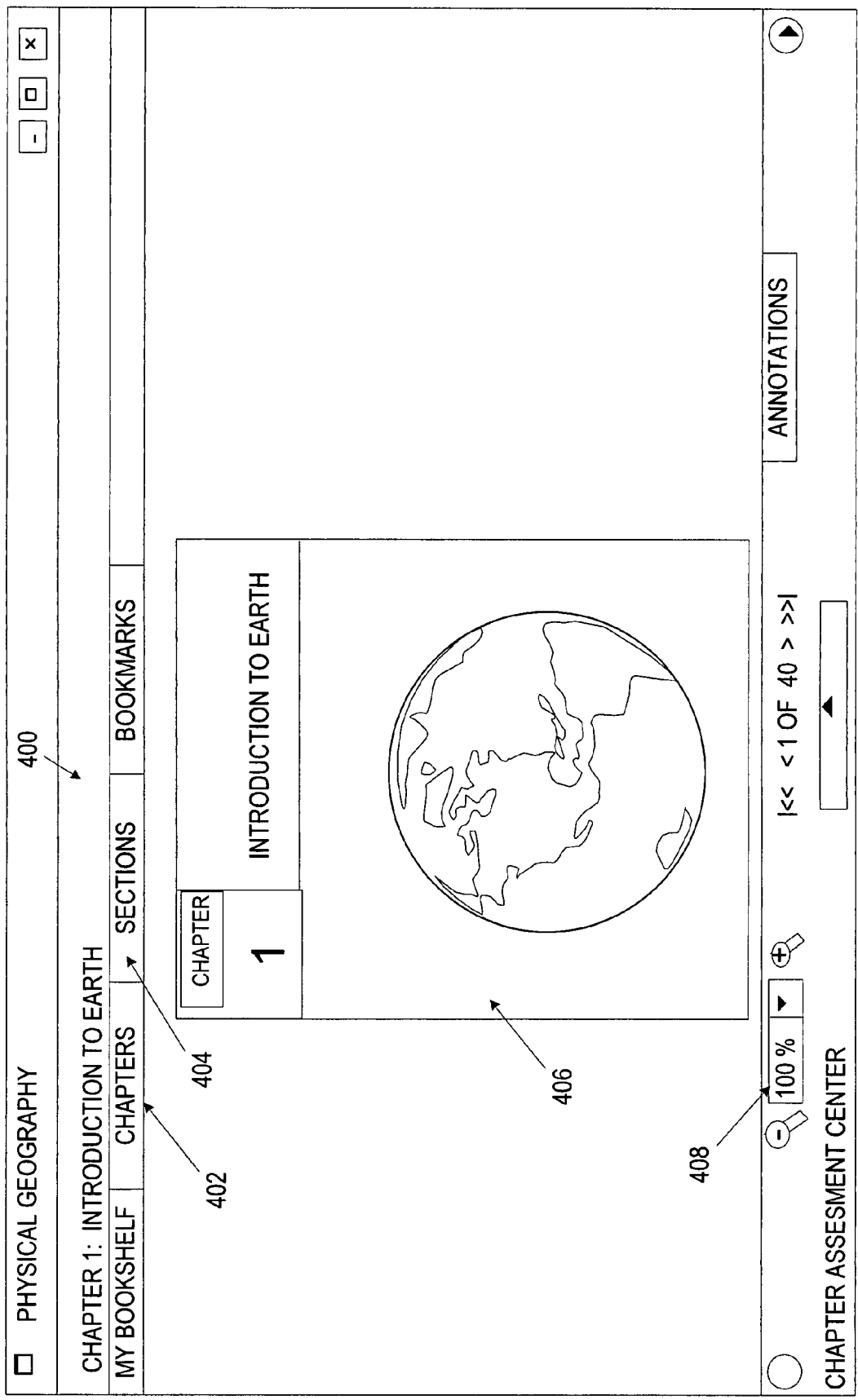
FIG. 6 shows a simulated screen 400 of one implementation that illustrates a document viewer application with options for displaying the table of contents.

FIG. 6 shows a simulated screen 400 that illustrates one implementation of document viewer application 200 with options for displaying the table of contents. Simulated screen 400 allows a user to select the chapters option 402 or the sections 404 option from the toolbar to display the table of contents. In other implementations, the table of contents feature can be displayed using fewer, additional, and/or other invocation mechanisms. The current position of the content 406 in the open document is displayed in the viewing window. Various document viewing features can be provided, such as a zoom utility 408 for viewing the document at varying percentages.

Figure 7:
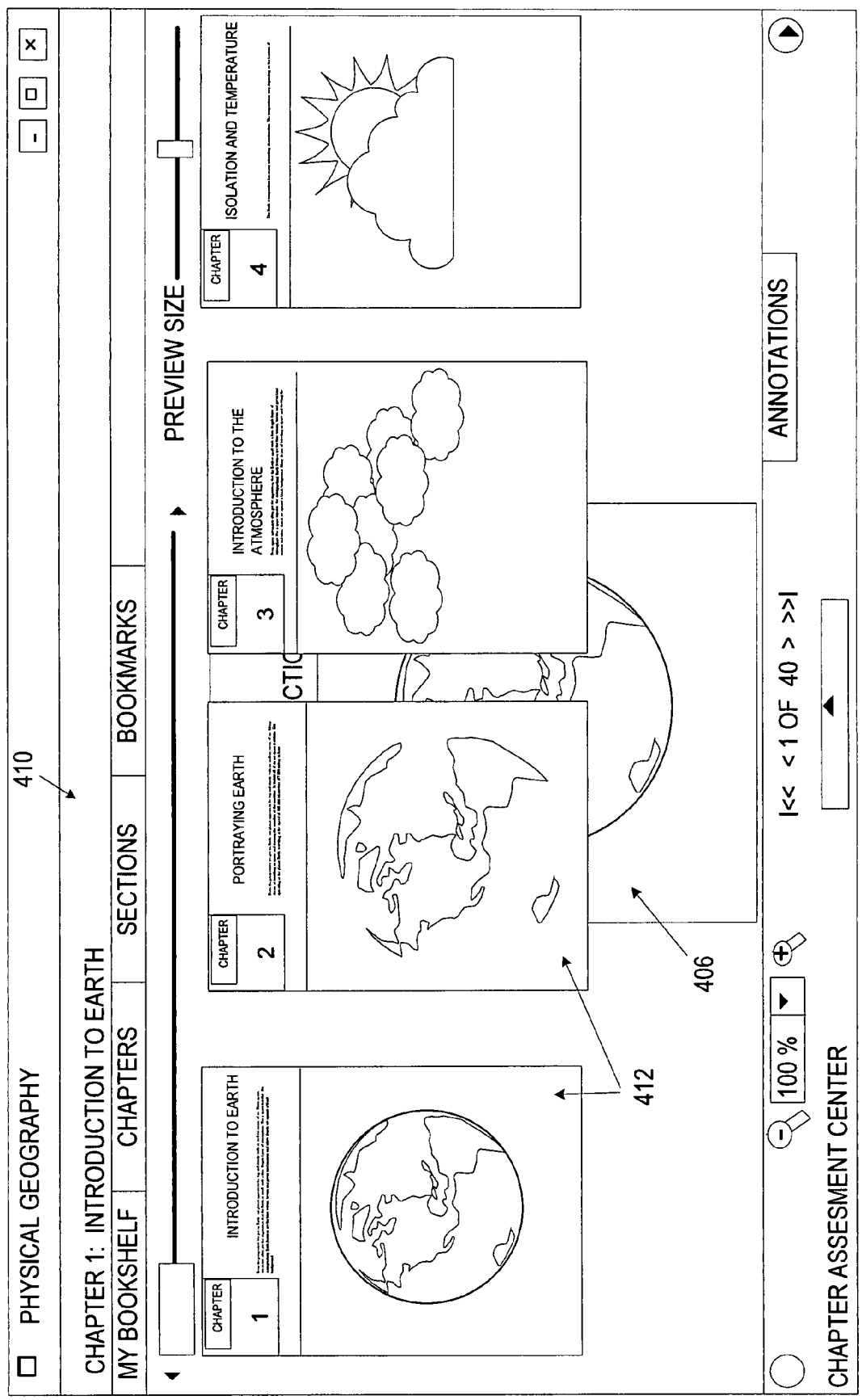
FIG. 7 shows a simulated screen of one implementation that illustrates displaying the table of contents in a thumbnail fashion over the current position of the content displayed in the open document.

Turning now to FIG. 7, a simulated screen 410 is shown of one implementation that illustrates displaying the table of contents in a thumbnail fashion 412 over the current position of the content 406 displayed in the open document. The thumbnails can be graphical or other representations that were programmatically or otherwise generated as actual representations of the underlying content they represent, and/or can be supplied by the document author or other user.

FIG. 8 shows a simulated screen 420 of one implementation that illustrates the use of a scrolling/navigation feature 422 that allows a user to navigate through the table of contents. Upon moving or otherwise using the scrolling/navigation feature 422, the table of contents 424 is adjusted to display additional content that previously would not fit on the screen based on the content representation size. In one implementation, the scrolling/navigation feature 422 is accessed by moving the slider bar across the screen with a mouse selection. Other non-limiting examples for how the scrolling/navigation feature could be accessed include using the page up and/or page down key on the keyboard, tapping a stylus on the screen, flicking a finger, and so on.

Figure 9:
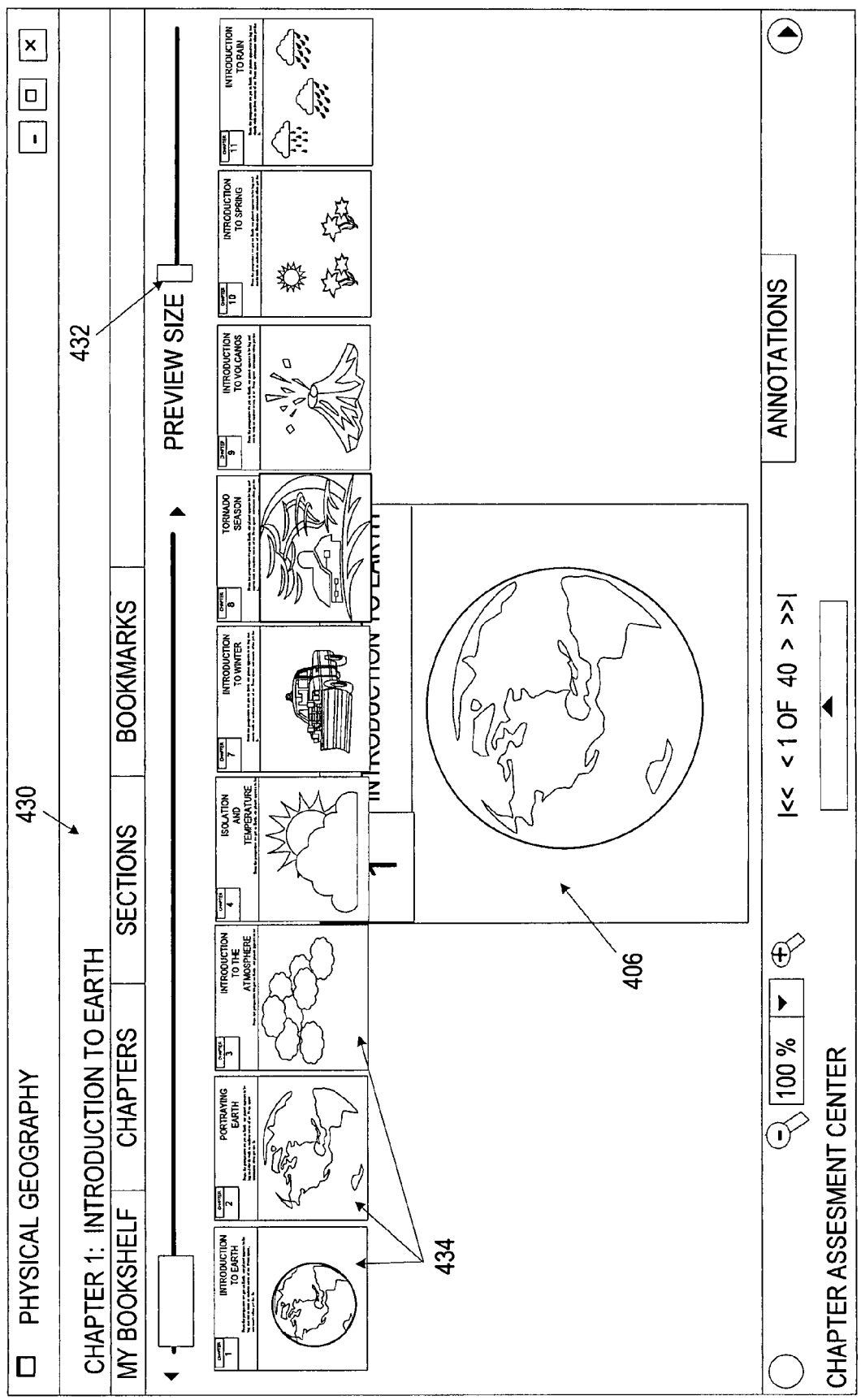
FIG. 9 shows a simulated screen of one implementation that illustrates using a preview size adjustment feature to adjust a preview size of the representations in the table of contents to a smallest available size.
Figure 10:
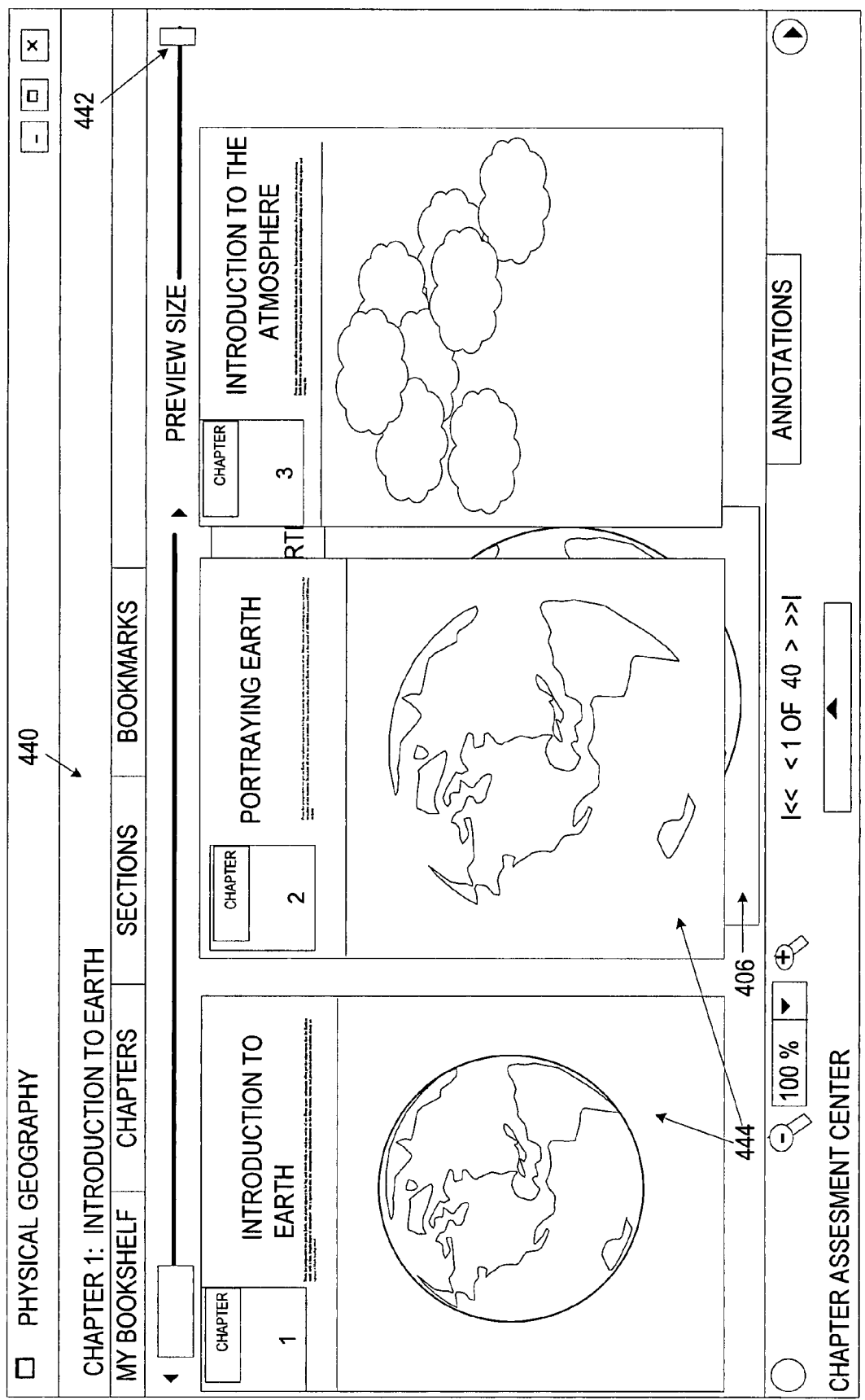
FIG. 10 shows a simulated screen of one implementation that illustrates using a preview size adjustment feature to adjust a preview size of the representations in the table of contents to a largest available size.

FIG. 9 shows a simulated screen 430 of one implementation that illustrates using a preview size adjustment feature to adjust a preview size of the representations in the table of contents to a smallest available size 432. Upon adjusting the preview size to the smallest available size 432, the representations in the table of contents 434 are made smaller, thereby making more of them fit in the display area. Similarly, FIG. 10 shows a simulated screen 440 of one implementation that illustrates using the preview size adjustment feature to adjust the preview size of the representations in the table of contents to a largest available size 442. Upon adjusting the preview size to the largest available size 442, the representations in the table of contents 444 are made larger, thereby making fewer of them fit in the display area. Notice how the current position of the content 406 in the open document remains underneath the table of contents in both examples as represented in FIGS. 9 and 10. By overlaying the table of contents over the document in this fashion, the user can maintain their current position in the document while viewing and navigating the table of contents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing a table of contents for a document viewer application comprising the steps of:
   providing a document viewer application that is operable to display a document that contains a plurality of pages of content;
   upon receiving a selection from the user to access a table of contents for the document, displaying a table of contents containing a plurality of thumbnail representations, each thumbnail representation corresponding to a respective portion of the plurality of pages of content, in a manner that is overlaid on top of a current position in the document, the plurality of thumbnail representations showing a representation of only a first page of each chapter in the document or a portion of the first page of each chapter in the document; and
   allowing the user to retain the current position in the document while viewing and navigating the plurality of thumbnail representations, the navigating comprising changing one or more thumbnail representations in the plurality of thumbnail representations while the plurality of thumbnail representations is overlaid on top of the current position in the document.

2. The method of claim 1, wherein one or more of the representations are programmatically generated representations that illustrate what an underlying content actually looks like on a particular corresponding page of the document.

3. The method of claim 1, wherein a particular one or more of the representations have been supplied by a document author.

4. The method of claim 1, wherein allowing the user to retain the current position comprises:
   allowing the user to retain the current position in the document while viewing and using a scrolling mechanism to scroll through the plurality of thumbnail representations;
   wherein using the scrolling mechanism to scroll through the plurality of thumbnail representations comprises changing the one or more thumbnail representations in the plurality of thumbnail representations while the plurality of thumbnail representations is overlaid on top of the current position in the document.

5. The method of claim 4, wherein an animation is provided when the scrolling mechanism is used to provide feedback to the user on how quickly the user is scrolling through the plurality of thumbnail representations.

6. The method of claim 1, wherein the user can modify a preview size to adjust a size of at least one thumbnail representation of the plurality of thumbnail representations.

7. The method of claim 1, wherein the user can view and navigate the pages of content separately from the table of contents while the table of contents is overlaid.

8. A computer-readable medium having computer-executable instructions for causing a computer to perform the steps recited in claim 1.

9. A computer-readable medium having computer-executable instructions for causing a computer to perform steps comprising:
   provide a document viewer application that is operable to display a document that contains a plurality of pages of content;
   provide a table of contents feature that displays a table of contents containing a plurality of thumbnail representations, each thumbnail representation corresponding to a respective portion of the pages of content, for the document in a manner that is overlaid on top of a current position in the document, the plurality of thumbnail representations showing a representation of only a first page of each chapter in the document or a portion of the first page of each chapter in the document;
   provide a navigation feature that allows a user to navigate through the plurality of thumbnail representations while retaining the current position in the document and allows the user to change one or more thumbnail representations in the plurality of thumbnail representations while the plurality of thumbnail representations is overlaid on top of the current position in the document; and
   provide a preview size adjustment feature that allows the user to adjust a size of at least one thumbnail representation of the plurality of thumbnail representations.

10. The computer-readable medium of claim 9, wherein one or more of the representations are programmatically generated graphical representations that illustrate what an underlying content actually looks like on a particular corresponding page of the document.

11. The computer-readable medium of claim 9, wherein a particular one or more of the representations have been supplied by a document author.

12. The computer-readable medium of claim 9, wherein an animation is provided when the navigation feature is used in order to provide feedback to the user on how quickly the user is navigating through the plurality of thumbnail representations.

13. A method for providing a table of contents feature for a document viewer comprising the steps of:
   providing a document viewer that has a table of contents feature that displays a table of contents containing a plurality of thumbnail representations, each thumbnail representation corresponding to a respective portion of a plurality of pages of content that are included in a document, in a manner that is overlaid on top of a current position in the document, the plurality of thumbnail representations showing a representation of only a first page of each chapter in the document or a portion of the first page of each chapter in the document;
   receiving input from the user to navigate the plurality of thumbnail representations using a navigation feature, the navigation feature allowing a user to change one or more thumbnail representations in the plurality of thumbnail representations while the plurality of thumbnail representations is overlaid on top of the current position in the document and providing an animation to give the user visual feedback on how quickly the navigation is occurring; and
   receiving input from the user to adjust a size of at least one thumbnail representation of the plurality of thumbnail representations in the table of contents upon using a preview size adjustment feature.

14. A computer-readable medium having computer-executable instructions for causing a computer to perform the steps recited in claim 13.

15. The method of claim 13, wherein one or more of the thumbnail representations are programmatically generated representations that illustrate what an underlying content actually looks like on a particular corresponding page of the document.

16. The method of claim 13, wherein at least one of the representations is received from an author of the document.

17. The method of claim 13, further comprising:
   enabling the user to retain the current position in the document while viewing and navigating the plurality of thumbnail representations, the navigating comprising changing one or more thumbnail representations in the plurality of thumbnail representations while the plurality of thumbnail representations is overlaid on top of the current position in the document 18. The method of claim 17, wherein enabling the user to retain the current position comprises:
   enabling the user to retain the current position in the document while viewing and using a scrolling mechanism to scroll through the plurality of thumbnail representations;
   wherein using the scrolling mechanism to scroll through the plurality of thumbnail representations comprises changing the one or more thumbnail representations in the plurality of thumbnail representations while the plurality of thumbnail representations is overlaid on top of the current position in the document.

19. The computer-readable memory device of claim 9, wherein the pages of content are navigable separately from the table of contents while the table of contents is overlaid.

20. The method of claim 13, wherein the pages of content are capable of being navigated separately from the table of contents while the table of contents is overlaid.

* * * * *